(12) United States Patent
Richard et al.

(10) Patent No.: US 7,032,498 B2
(45) Date of Patent: Apr. 25, 2006

(54) VACUUM BRAKE BOOSTER

(75) Inventors: Philippe Richard, Chelles (FR); Jean-Pierre Michon, Saint Pathus (FR)

(73) Assignee: Robert Bosch GmbH, Stuttgart (DE)

( * ) Notice: Subject to any disclaimer, the term of this patent is extended or adjusted under 35 U.S.C. 154(b) by 74 days.

(21) Appl. No.: 10/848,271

(22) Filed: May 18, 2004

(65) Prior Publication Data
US 2004/0232761 A1     Nov. 25, 2004

(51) Int. Cl.
*F15B 9/10* (2006.01)

(52) U.S. Cl. .................................. 91/376 R

(58) Field of Classification Search ............... 91/369.3, 91/376 R
See application file for complete search history.

(56) References Cited

U.S. PATENT DOCUMENTS 5,257,572 A * 11/1993 Jakobi et al. .............. 91/376 R

* cited by examiner

*Primary Examiner*—F. Daniel Lopez
(74) *Attorney, Agent, or Firm*—Leo H McCormick, Jr.; Warren Comstock; Sarah Taylor

(57) ABSTRACT

A braking amplifier for a vehicle having a vacuum chamber (10), a working chamber (12) separated by a housing (14), a shutter (30) and an intermediate chamber (64). The intermediate chamber (64) is located in the housing (14) and defined by a plurality of circular zones (44) arranged around and axis (6) of the amplifier that are in communication with the vacuum chamber (10). The end of the circular zones (4) have a rear section (50) that form a seat (52) for the shutter (30). The shutter (30) selectively engaging seat (52) to interrupt communication between the vacuum chamber (10) and the intermediate chamber (64) and thereafter place the intermediate chamber (64) in communication with the working chamber (12) to effect a brake application.

6 Claims, 2 Drawing Sheets

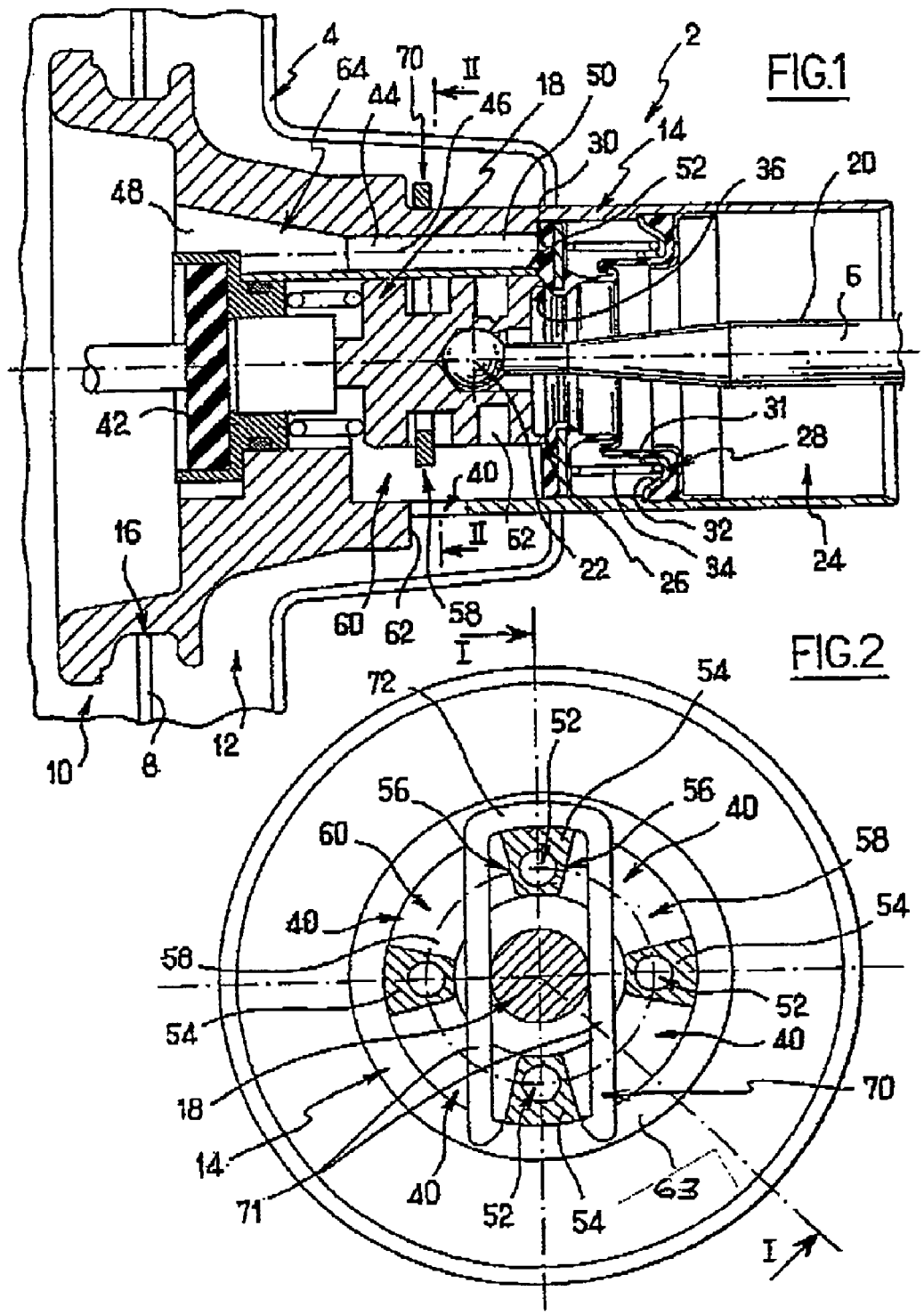

VACUUM BRAKE BOOSTER

The invention relates to vacuum differential braking force amplifiers for motor vehicles.

BACKGROUND OF THE INVENTION

Such amplifiers are generally well known. They make it possible to boost the braking force supplied by the brake pedal and supply this boosted force to the master cylinder Particular reference will be made here to the amplifier described in Patent EP-0 509 866. The amplifier comprises a cavity in which a movable wall separates a vacuum chamber that is in permanent communication with a vacuum source and a working chamber. The amplifier comprises a shutter (control valve) connected to the brake pedal and able to bear against a seat contiguous to an intermediate chamber in permanent communication with the vacuum chamber.

When it is remote from the seat, the shutter places the intermediate chamber in communication with the working chamber such that the working chamber is subjected to the partial vacuum prevailing in the vacuum chamber. This is the situation with the amplifier at rest. When a braking action is required, the shutter isolates the intermediate chamber from the working chamber and then gradually places the later in communication with atmospheric air. The pressure thus increases in the working chamber, which causes the movable wall connected to the master cylinder to move in the cavity. When the braking command is broken off, the shutter retreats in order to move away from its seat and place the intermediate chamber once more in communication with the working chamber.

However, at this stage, since a relatively low pressure prevails in the intermediate chamber and since a higher pressure prevails in the working chamber, the shutter is often pressed against its seat by the pressure difference. The plunger that actuates the shutter for this purpose must therefore supply a substantial force to detach the shutter from its seat.

In addition, the load, and therefore the stiffness, of the spring associated with the shutter must be relatively high. These two factors generate hysteresis between the outward curve and the return curve connecting the output force of the amplifier to the input force. This hysteresis is manifested in practice by the driver experiencing a dissimilarity in feel between applying and releasing the brake pedal.

SUMMARY OF THE INVENTION

An aim of the invention is to arrange for the action of stopping the braking to follow the corresponding command without delay.

To this end, a braking amplifier for a vehicle has been provided according to the invention, comprising:
- a vacuum chamber;
- a working chamber;
- a shutter; and
- an intermediate chamber communicating with the vacuum chamber and forming a seat for the shutter such that the shutter is able to place the intermediate chamber in communication with the working chamber and to prevent this communication, the seat being formed by several separate zones.

Thus, the area of the shutter subjected to the moderate pressure prevailing in the intermediate chamber is reduced. The stress generated on the shutter by the difference in pressure between the intermediate chamber and the working chamber is thus reduced as a consequence. Hence, when the braking command is discontinued, the shutter may be detached from the seat with a small force, with the sticking effect being reduced at the same time. Additionally, it is possible to reduce the load, and therefore the stiffness, of the spring associated with the shutter, the spring having a constant load per unit length. These two factors make it possible to reduce the hysteresis between the outward curve and the return curve connecting the output force of the amplifier to the input force. The associated dissimilarity in the feel of the pedal between application and release is thus lessened.

The amplifier according to the invention may also have at least any one of the following features:
- the zones succeed one another in a direction that is circumferential to a main axis of the amplifier;
- the zones are circular;
- there are at least three and preferably at least four zones;
- the seat lies in a plane perpendicular to a main axis of the amplifier;
- the intermediate chamber comprises several separate ducts whose respective ends form the zones;
- the amplifier comprises a wall forming the intermediate chamber and having cavities between the zones in the circumferential direction with reference to a main axis of the amplifier;
- the cavities extend between the ducts;
- the wall forms a housing, the cavities opening radially toward the inside of the housing, toward the outside of the housing or both at the same time;
- the seat has a cross section perpendicular to the axis with an area of between $50 \times 10^{-6}$ and $150 \times 10^{-6}$ m$^2$; and
- the amplifier comprises a key that passes through at least one of the cavities, this key adjusting a position of a plunger of the amplifier with respect to the housing.

Other features and advantages of the invention will also emerge from the following description of a preferred embodiment given by way of nonlimiting example.

BRIEF DESCRIPTION OF THE DRAWINGS

FIG. 1 is a partial view in longitudinal axial section of an amplifier according to a preferred embodiment of the invention, the section being formed along the two half-planes I—I illustrated in FIG. 2;

FIG. 2 is a partial view in cross section along the plane II—II of the amplifier of FIG. 1.

DETAILED DESCRIPTION OF THE INVENTION

Figure 3:
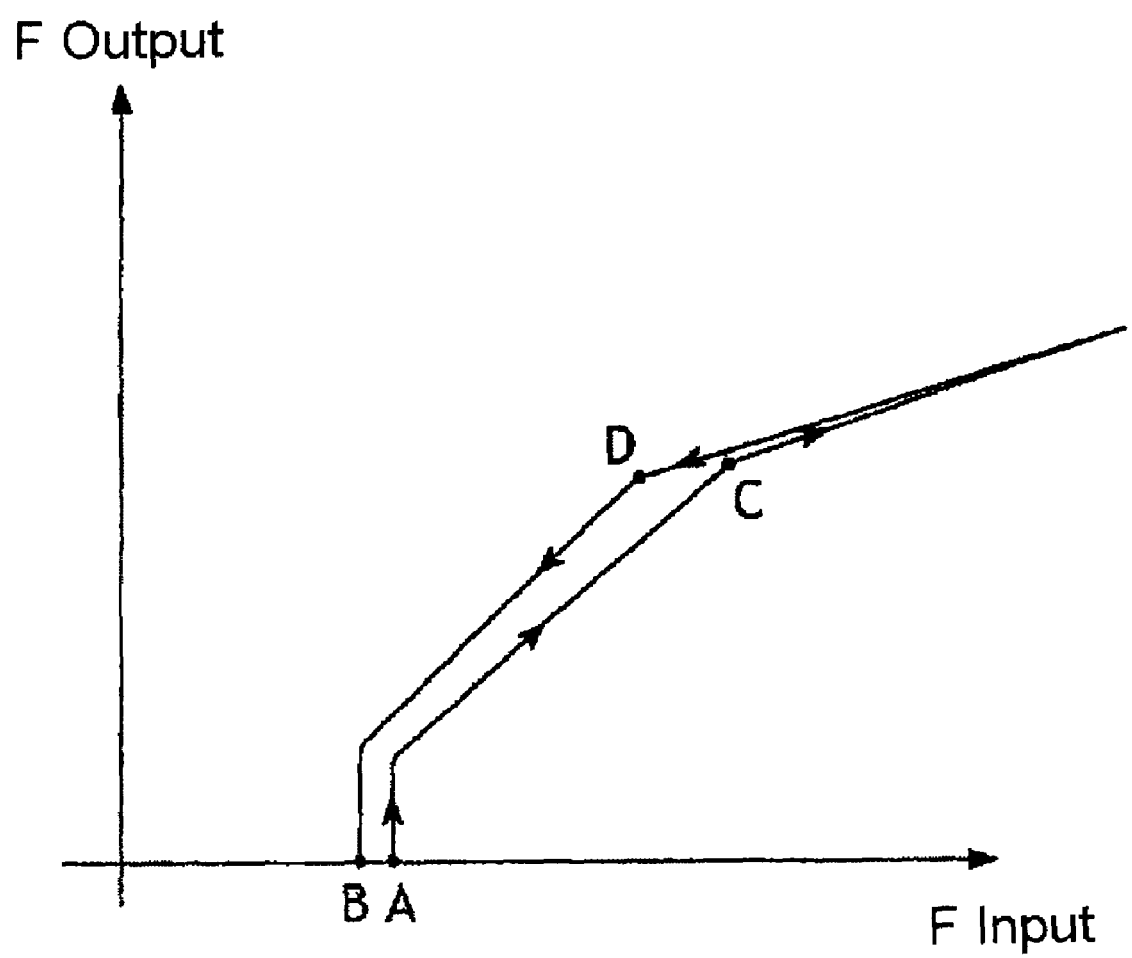
FIG. 3 illustrates the course of the curve between the input force and the output force of the amplifier according to the invention.

The amplifier 2 illustrated in FIG. 1 is an amplifier for boosting braking intended to be placed in the usual way between the brake pedal of a motor vehicle and the master cylinder controlling the hydraulic brake circuit of this vehicle. By convention, front of the amplifier refers to the part of the latter facing the master cylinder and pointing to the left in FIG. 1, and rear refers to the part facing the brake pedal and pointing to the right in the same figure.

The amplifier comprises an outer casing 4 in the shape of a shell with a symmetry of revolution about a central main axis 6 of the amplifier. This casing has been represented schematically in FIG. 1. The amplifier comprises a diaphragm 8 defining, inside the space delimited by the casing 4, a front chamber 10 that will be referred to here as vacuum chamber and a rear chamber 12 that will be referred to as working chamber, the diaphragm 8 separating these two chambers from one another. The amplifier includes a housing 14 or piston of axis 6 having a flared front part. The diaphragm 8 has a circular central edge 16 of axis 6 fixed to the free end of the flared part of the housing 14.

The amplifier includes a plunger 18 that is housed in a central cavity of the housing 14 while being able to move by sliding therein. The plunger for its part also has a symmetry of revolution about the axis 6. The amplifier includes a control rod 20 of axis 6 whose front end 22 is fixed by means of a ball joint in a rear socket of the plunger 18. The rear end (not shown) of this rod 20 projects outside the housing to be controlled directly by the brake pedal (not shown) of the vehicle.

The rod 20 and a tubular rear part of the housing 14 delimit an annular rear space 24 in air communication with atmospheric air by way of an air filter (not shown).

The amplifier includes a three-way valve 26 that is able to place the working chamber 12 sometimes in communication with the vacuum chamber 10 and sometimes with the atmospheric air of the rear space 24. The amplifier comprises an elastomeric flexible sleeve 28 having a front part 31 that forms a shutter of the valve 26. The sleeve 28 has a symmetrical shape of revolution of axis 6. It comprises a rear part that progressively widens toward the rear and is fixed in a sealed manner at its end edge to the inside of the tubular rear part of the housing 14 so as to delimit the space 24 toward the front. This rear part is held in place by means of a metal cup 32 bearing against a front face of this rear part and itself urged toward the rear by a compression spring 34. The latter bears toward the rear against the cup 32 and toward the front against a rear face of the shutter 30. The spring thus urges the shutter forward. During its movement, the shutter 30 remains in contact with the cylindrical inner face of the housing 14.

The plunger 18 has a rear end edge 36 of annular shape that forms a first seat for the shutter 30. This seat is uninterrupted in the circumferential direction about the axis 6.

The working chamber 12 communicates with the inside of the housing 14 in the region of its front part situated in front of the shutter 30 by means of several orifices 40 that will be described in detail later. Each orifice has an axis that is radial to the axis 6, is formed in one side of the housing and opens out inside said housing.

When the plunger is drawn back sufficiently such that the seat 36 is no longer in contact with the shutter, the rear space 24 of the housing is in air communication with the working chamber 12 through the orifices 40.

The amplifier includes other elements that are known per se and have not been described in detail, such as a return spring for the diaphragm 8 or a reaction disk 42 lying in the forward extension of the plunger. Reference may be made, for example, to Patent EP-0 509 866 in relation to all the conventional elements of the amplifier that have not been described.

The inside of the housing 14 opens at its front end into the vacuum chamber 10, which is itself, moreover, in permanent communication with a vacuum source (not shown) of the vehicle. The main wall of the housing has a general tubular shape defined by ducts 44, in this case numbering four but the number of which could be different. The ducts 44 are identical to one another. Each duct 44 has an elongate general shape parallel to the axis 6 that has an axis 46 parallel to said axis. The ducts 44 extend around the plunger 18. Each duct has a front section 48 whose shape is such that it tends to move away from the axis 6. This section opens into the vacuum chamber 10 at the front end of the housing. Each duct 44 additionally comprises a rear section 50 of cylindrical shape. In this case, the front 48 and rear 50 sections constitute the duct 44. The rear end 52 of the cylindrical section 50 opens out directly opposite the shutter 30 so as to be contiguous to it.

As shown in FIGS. 1 and 2, the wall of the housing 14 in this case has bulges 54 whose number is the same as the number of ducts 44, extending from front to rear of the housing over the whole length of the ducts and additionally extending so as to project in the radial direction inside the housing. Each of the bulges 54 has a profiled shape running parallel to the axis 6, the shape of the profile in cross section perpendicular to the axis 6 being essentially that of a trapezoid. Each bulge thus has two lateral faces 56 that progressively diverge away from one another as the distance from the central axis 6 increases. The very shape of these bulges forms cavities 58 between them, these being arranged between the successive bulges in the circumferential direction with reference to the axis 6. The ducts 44 are formed in the respective bulges 54. Both the ducts and the bulges are evenly distributed about the axis 6 in a cruciform pattern. The same therefore applies to the four cavities 58 extending between them.

The four cavities 58 define a front chamber 60 that is internal to the housing. In this chamber, the cavities 58 communicate with one another by means of annular grooves 62 formed in an external face of the plunger 18. The cavities 58 open out radially in the direction of the axis inside the housing. The front chamber is delimited in the radial direction toward the axis 6 by the external face of the plunger and in the opposite direction to the axis 6 by the wall of the housing. This same wall also delimits the chamber toward the front, while the chamber is able to be closed off toward the rear by the shutter 30. The chamber 60 is contiguous to the orifices 40. The rear space 24 of the housing may be placed in air communication with the working chamber 12 by way of this chamber 60 and via the central passage of the sleeve 28.

The orifices 40 are arranged in the wall of the housing at the locations left free by the bulges 54, and therefore between the latter. The orifices 40 here number four and they too are evenly distributed about the axis 6. At the same level as the orifices 40, the cavities 58 are thus likewise in communication in the radial direction with the outside of the housing, that is to say with the working chamber 12. However, the orifices 40 extend over only a fraction of the length of the cavities 58 parallel to the axis 6, typically over half of this length. At their front, they are contiguous to a shoulder 63 that is formed in the external face of the housing and tends to widen said face.

The ducts 44 delimit, the four of them, an intermediate chamber 64 that is in permanent and direct air communication with the vacuum chamber 10.

The rear openings 52 of the ducts 44 together constitute zones forming a second seat for the shutter 30. The zones 52 separated from one another in the circumferential direction with reference to the axis consequently define the various parts of the seat. The seat 52 lies in a plane perpendicular to the axis 6. Thus, when the shutter 30 bears toward the front against the free rear end of the bulges 54 and when suitable pressure conditions are satisfied, this shutter closes off each of the four ducts 44 in a sealed manner. The portions of the shutter 30 that are not in contact with the bulges 54 thus extend facing the cavities 58.

The amplifier operates in a similar manner to most of the amplifiers of the prior art. At rest, the plunger 18 is in a retreated (but not the most retreated) position with its seat 36 bearing against the shutter 30 such that the rear space 24 is isolated from the front chamber 60 of the housing. This is an intermediate position of the plunger. On the other hand, since the shutter extends at a distance from the ducts 44, it allows free air communication between these ducts and the front chamber 60 such that the working chamber 12 is in air communication with the vacuum chamber 10 and is thus subjected to the partial vacuum prevailing permanently in the latter.

When the driver of the vehicle actuates the brake pedal, he causes the rod 20 together with the plunger 18 to advance, the effect of this being initially to place the shutter 30 in contact with the seat defined by the rear end of the ducts 44. The intermediate chamber 64 is thus isolated from the front chamber 60. The continuation of the movement of the plunger causes its seat 36 to move away from the shutter 30, thus placing the front chamber 60 in air communication with the rear space 24, which has the effect that the working chamber 12 begins to fill with atmospheric air and which may lead to a forward movement of the diaphragm 8 together with the housing 14 to operate the master cylinder.

When the braking command is discontinued, the rod 20 thus retreats, as does the plunger 18, which places the plunger in contact with the shutter 30 and consequently breaks off air communication between the front chamber 60 and the rear space 24. In a second stage, continuation of the retreat of the plunger detaches the shutter from the bulges 54 so as to re-establish air communication between the intermediate chamber 64 and the working chamber 12.

The plunger then takes up an extreme retreated position ensuring that the front and rear chambers are placed in maximum communication to allow the booster to return rapidly to a rest position. It finally assumes the rest position.

In the knowledge that the area of the shutter subjected to the partial vacuum prevailing initially in the intermediate chamber 64 is relatively small, the shutter is detached from the seat 52 by means of a moderate force of the plunger 18. FIG. 3 illustrates the course of the curve, indicating the change in intensity of the output force supplied by the amplifier as a function of the input force applied by the driver by means of the brake pedal.

Point A indicates the engagement force applied by the driver to generate an output force.

Point C is the saturation point of the application, that is to say the point after which the output force increases relatively little with the input force.

Point D is the point of return after saturation. It marks the reverse phenomenon, when the driver decreases his force on the pedal.

Point B indicates the intensity of the force supplied by the driver when the amplifier stops producing an output force.

The offset between the engagement course and the return course corresponds to the aforementioned hysteresis.

This hysteresis may be reduced at two levels by means of the invention.

First of all, the offset between points D and C may be reduced by two factors:

firstly by reducing the sticking effect of the shutter due to suction. The relative contribution of this factor toward this reduction with respect to the second factor is about 25%. For this, the area of the seat 52 may be reduced, for example, from 3.35 cm$^2$ to 80 mm$^2$, secondly by reducing the loading of the valve spring 34 by 25 to 30%, which contributes to reducing the hysteresis between points D and C for a relative proportion of 75%.

Then, the offset between points A and B is for its part also reduced by reducing the loading of the spring.

The cylindrical rear sections 50 here have a diameter of 5 mm. Experiments have shown that a rearward travel of 1.46 mm by the plunger is sufficient to detach the shutter from the seat 52. Whereas the force of the plunger on the shutter for this purpose may be 27 newtons in the prior art, it may be lowered to 0.16 N in this case. The seat 52 preferably has an area of between 50 mm$^2$ and 150 mm$^2$. The saving in material brought about by the cavities 58 also makes it possible to reduce the weight of the amplifier.

The fact that the intermediate chamber is produced with a discontinuous shape with the four ducts 44 rather than with a continuous annular shape makes it possible to leave free spaces formed by the cavities 58 optionally in communication with the inside and outside of the housing. As illustrated in the figures, this space may be used to house a key 70, making it possible in a manner known per se to adjust the intermediate position of the plunger 18 with respect to the housing 14, that is to say the aforementioned intermediate position associated wit the rest position. Suitable bearing points for the wrench on the housing on the one hand and the plunger on the other hand enable the aforementioned position to be defined. The key makes it possible to precisely define the play between the housing and the plunger in the rest position of the latter, doing so in such a way as to reduce the dead travel of the plunger as much as possible.

The key 70 in this case has a planar general shape inscribed in a plane perpendicular to the axis 6. The key is in the form of a rod that has been folded in order to give it the general shape of an inverted U whose two branches 71 are rectilinear and elongate. The U is mounted such that it straddles the upper bulge 54 extending in the vertical plane of symmetry of the amplifier, the base 72 of the U bearing radially against this bulge by its outside. The two branches 71 extend vertically parallel to this plane and are housed in a groove formed in the external face of the plunger 18. The two branches 71 extend vertically downward between the plunger 18 and the two, left and right, bulges 54 respectively, and then further down so as to face the lateral faces 56 of the lower bulge 54. The free ends of the branches extend beyond the latter.

Of course, many modifications may be made to the invention without departing from the scope thereof.

The number of zones forming the seat 52 of the intermediate chamber may be varied. It is possible to arrange for the various seat zones to open over a short distance toward the front in an annular chamber, such that the ducts 44 are much shorter than in the present embodiment. Other shapes for the profile of the zones of this seat may be proposed, for example an oval shape elongated in the circumferential direction or else a rectangular shape.

We claim:

1. A braking amplifier for a vehicle, comprising:
    a vacuum chamber (10);
    a working chamber (12);
    a housing (14) for separating the vacuum chamber (10) from the working chamber (12);
    a shutter (30); and an intermediate chamber (64) located in the housing (14) and in communication with the vacuum chamber (10) having a rear section (50) whose end forms a seat (52) for the shutter (30), said shutter (30) selectively engaging seat (52) to interrupt communication between said vacuum chamber (10) and the intermediate chamber (64) and thereafter placing the intermediate chamber (64) in communication with the working chamber (12) to effect a brake application, characterized in that the seat (52) is formed by several separate circular zones (44) that succeed one another in a circumferential direction about a main axis (6) of the amplifier to define passages to provide communication between the intermediate chamber (12) and working chamber (12).

2. The amplifier according to claim 1, characterized in that there are at least four circular zones.

3. The amplifier according to claim 1, characterized in that the seat (52) lies in a plane perpendicular to a main axis (6) of the auxiliary amplifier.

4. The amplifier according to claim 3, characterized in that the seat (52) has a cross section perpendicular to the axis (6) with an area of between $50 \times 10^{-6}$ and $150 \times 10^{-6}$ m$^2$.

5. The amplifier according to claim 1, characterized in that the housing 14 includes cavities (58) that extend between the circular zones (44).

6. The amplifier according to claim 5, characterized in that it includes a key (70) passing through at least one of the cavities (58) for adjusting a position of a plunger (18) of the amplifier with respect to a housing (14) of the amplifier.

* * * * *